United States Patent [19]
Torri et al.

[11] 3,708,044
[45] Jan. 2, 1973

[54] VEHICLE EXPANDING BRAKE ASSEMBLY

[75] Inventors: Tatsumi Torri; Asao Kozakai; Takekazu Yamamoto; Mizuo Nyunoya, all of Kariya, Japan

[73] Assignee: Aisin Seiki Company Limited, Aichiken, Japan

[22] Filed: May 18, 1971

[21] Appl. No.: 144,677

Related U.S. Application Data

[63] Continuation of Ser. No. 797,062, Feb. 6, 1969, abandoned.

[52] U.S. Cl. ............................... 188/326, 188/106 F
[51] Int. Cl. ......................... F16d 51/22, F16d 51/24
[58] Field of Search....... 188/106 A, 106 F, 327, 328, 188/331, 326

[56] References Cited

UNITED STATES PATENTS 2,372,319  3/1945  Francois ........................ 188/106 A
3,292,745  12/1966  Dombeck ........................ 188/106 A
2,351,952  6/1944  Goepfrich ........................ 188/106 A

FOREIGN PATENTS OR APPLICATIONS 543,339  2/1942  Great Britain ...................... 188/328

Primary Examiner—George E. A. Halvosa
Attorney—Sughrue, Rothwell, Mion, Zinn & Macpeak

[57] ABSTRACT

An automotive vehicle brake assembly, comprising a rotatable brake drum, a hydraulic service brake section and an emergency or parking brake section, both of said brake sections when actuated either separately or jointly are arranged to cooperate with a common pair of brake shoes adapted for frictional cooperation with said drum, said assembly being characterized by the provision of at least one mechanical linkage connected between both of said brake sections so as to modify the brake actuating mode of at least one of said brake sections under certain operating conditions.

6 Claims, 13 Drawing Figures

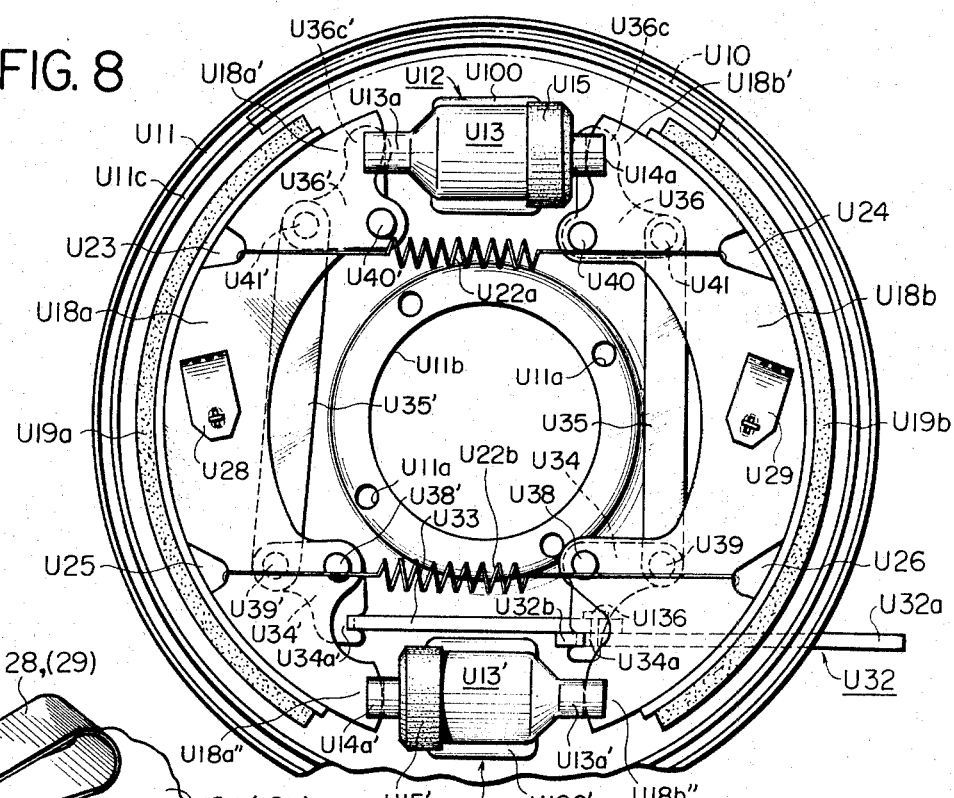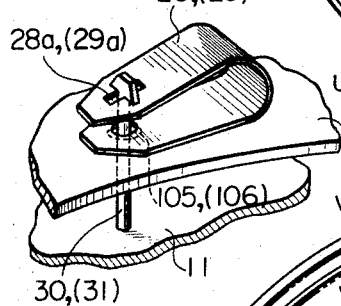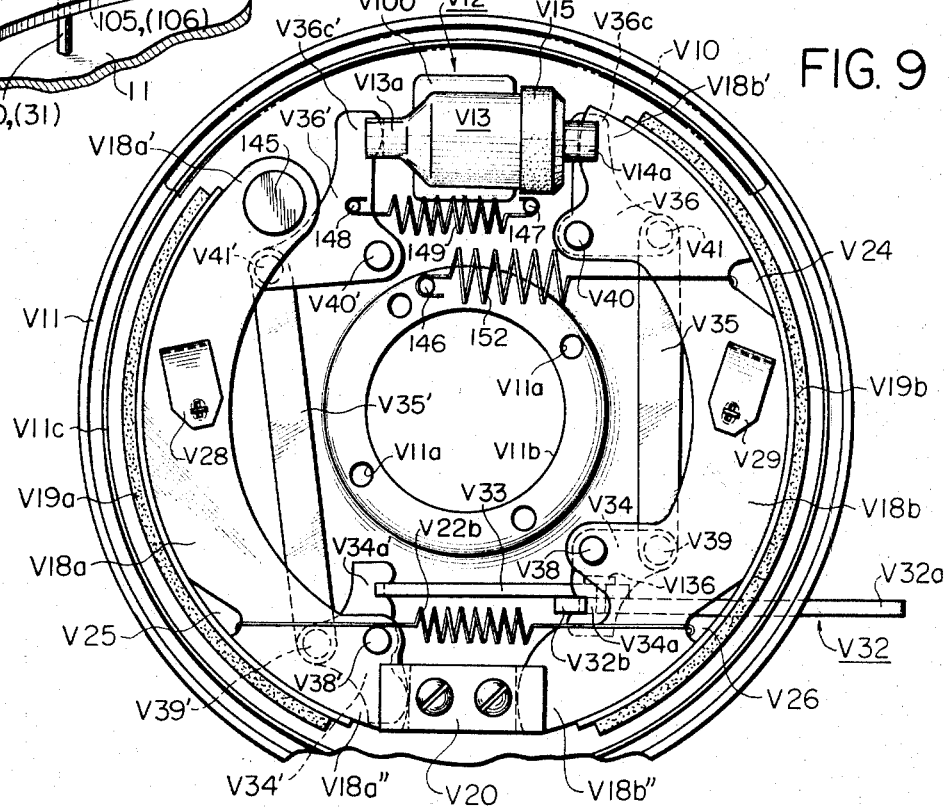

3,708,044

VEHICLE EXPANDING BRAKE ASSEMBLY

This is a Continuation of application Ser. No. 797,062, filed on Feb. 6, 1969, now abandoned.

This invention relates generally to improvements in automotive vehicle brake systems. More specifically, it is concerned with an automotive brake system comprising a hydraulic braking section and a mechanical braking section, wherein both sections are adapted for actuating at least a pair of brake shoes engageable with a rotatable brake drum rigidly connected with a vehicle wheel, the single wheel only being considered for simplicity. Said mechanical brake section may be replaced under occasions by a hydraulic one.

The hydraulic braking section is called generally "wheel brake cylinder unit" and is normally operatively connected through a master cylinder with a conventional brake pedal, so as to function as a "service brake," while the mechanical brake section is operatively connected with a conventional emergency or parking brake plunger or lever which is operable manually by the driver of the vehicle, so as to constitute a "parking" or "emergency" brake system.

It is one of the technical requirements for the automotive service brake to provide a reduced braking effect relative to the input actuating effort applied to the brake mechanism, so as to assure a stabilized and delicate braking effect, especially when the vehicle is running at a high speed. For this purpose, it is highly desirous to design the brake mechanism to be of the leading-trailing brake type. By employing this means, the desirous antifading characteristics of the brake are also assured. On the other hand, the emergency or parking brake of the mechanical type should have such a characteristic as to provide a large as possible braking effect with a certain brake input, because there is no requirement of the stabilized and delicate brake function and of antifading performance. For this purpose, it is desired to design this kind of brake to be of the duoservo-brake type.

In most conventional automotive brake arrangements comprising the service brake and the parking or emergency brake, the following drawback would be encountered under circumstances. More specifically, assuming that the driver of a moving vehicle actuates and locks the emergency brake in its applied position, with the service brake having been already applied, and since the brake actuating effort of the service brake is larger than that of the emergency brake, the braking effect provided by the latter could be unintentionally nullified, should the service brake be released intentionally. Therefore, the driver must reactuate the emergency brake.

A further drawback inherent in the conventional brake of the above kind resides in such a disadvantageous feature that when the emergency brake is applied with the service brake already applied and kept in its working conditions, the overall brake effect is not effective in the cumulative sense of both braking effects, and thus a relatively large manipulating effort is necessary to apply to the emergency brake.

One of the objects of the present invention is to provide a combined braking system of the above kind, yet capable of obviating substantially the aforementioned conventional drawbacks.

A further object is to provide a braking system of the above type with its service brake and emergency brake operable separately from each other or jointly with each other as the occasion may require, yet without causing any undesirous jamming effect to each other.

A still further object is to provide a braking system of the above kind wherein common brake shoes act in a leading-trailing brake mode or in a duoservo-brake mode when both brakes are separately actuated.

Another object is to provide a braking system of the above kind, capable of performing an automatic brake gap adjusting function.

Still another object is to provide a braking system of the above kind which is simple in its design, reliable in its operation and easy to manufacture.

The braking system for an automotive vehicle wheel according to this invention in its broadest sense comprises in combination, a rotatable brake drum mechanically connected with a vehicle wheel for unitary rotation therewith, a stationary backing plate fixedly mounted on a stationary part of the vehicle, a pair of brake shoes movably mounted on said backing plate, said shoes being adapted for braking cooperation with said drum, hydraulic actuating means mounted on said backing plate between said shoes and adapted for applying and releasing urging forces to and from one side end of said shoes relative to said drum, either a stationary or slidable member mounted on said backing plate and adapted for mounting in turn the other ends of said shoes, a manually operable means mounted on said backing plate for expanding one or the other side ends of said shoes and a mechanical linkage means connecting said manually operable means with said hydraulic means.

These and further objects, features and advantages of the invention will become more clear when reading the following detailed description of several preferred embodiments of the invention by reference to the accompanying drawings which constitute part of the specification.

In the drawings:

FIG. 5 is a perspective view of a shoe-hold down means employed in the first embodiment.

FIG. 8 is a similar view to FIG. 1, showing a fourth embodiment of the invention.

FIGS. 9 – 11 are similar views to FIG. 1, showing fifth to seventh embodiments of the invention, respectively.

Figure 1:
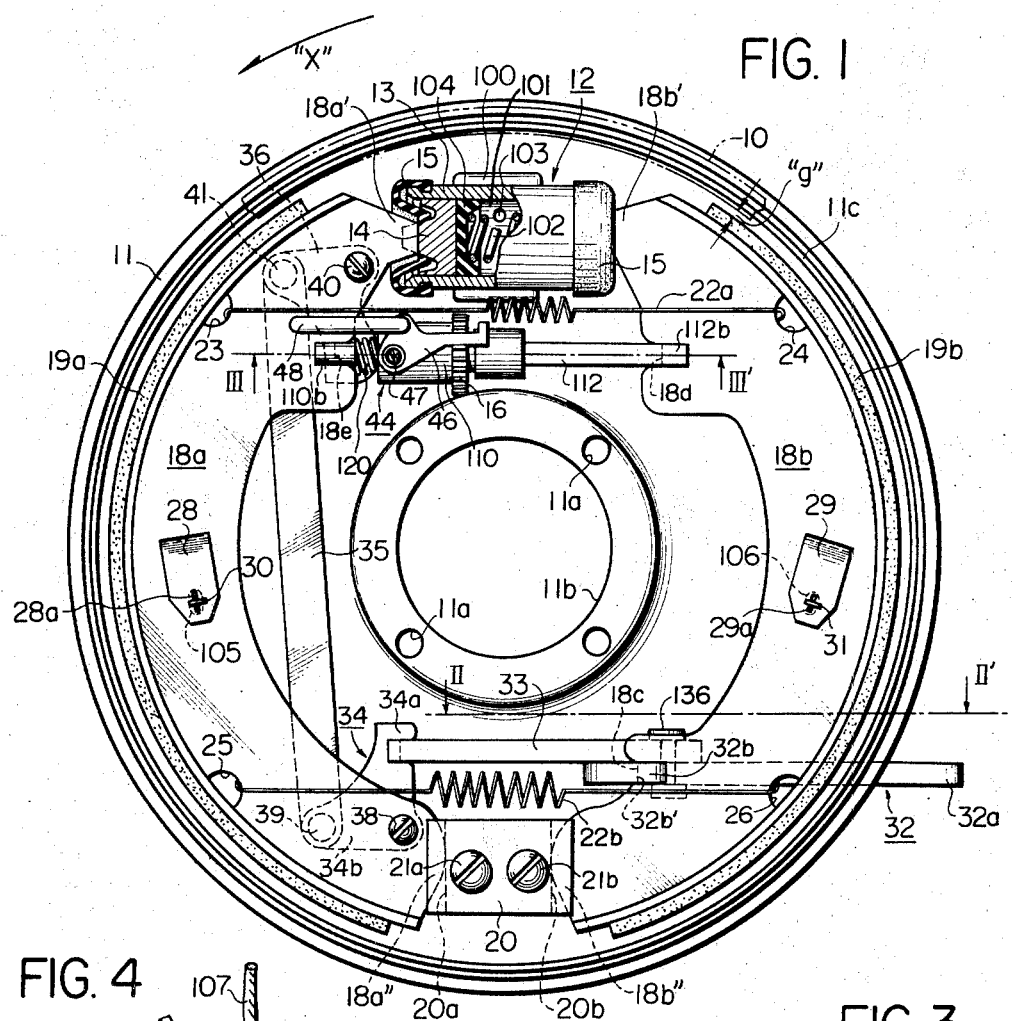
FIG. 1 is a front view of the main working parts of a first embodiment of the invention.
Figure 4:
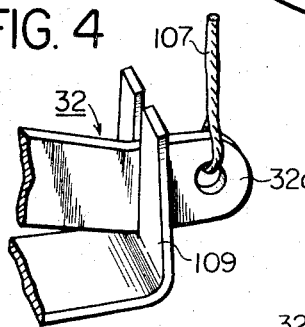
FIG. 4 is a partial perspective view showing an actuating lever of for the parking brake section and a fork type guide for said lever.

Referring now to the accompanying drawings, especially FIGS. 1 – 5, a first embodiment of the invention will be described in detail hereinbelow.

The numeral 10 represents, only partially and by chain-dotted lines, a conventional cup-shaped brake drum which is fixed to the outer end of a rotatable rear axle shaft of an automotive vehicle. The details have been omitted from the drawing since this is a well-known structure. This also applies to several further embodiments of the invention to be described. 11 represents a conventional backing plate having generally a centrally perforated disc configuration as shown, the central perforation being shown at 11b. In addition, the plate 11 is formed with a peripheral recess at 11c which slidingly receives a peripheral flange formed on the rotatable drum 10, although not shown. The backing plate 11 is formed with a plurality of bolt holes 11a adapted for receiving respective fixing bolts, not shown, for fixingly attaching the plate 11 to a stationary housing for a bearing which rotatably holds said axle shaft, although this structure is not shown on account of its popularity. The provision of said central opening 11b serves for receiving said bearing housing as is done conventionally.

Hydraulic wheel piston-cylinder assembly, generally shown at 12, is detachably mounted on the backing plate 11 by means of conventional attaching means such as bolts, pressure fitting means or the like. For this purpose, the assembly 12 is formed integrally with a mounting plate 100 which is snugly inserted into a corresponding recess, not shown, formed on the backing plate. The assembly is provided with a pair of hydraulic pistons 14 which are arranged slidably in a cylinder block 13 made integral with said mounting plate 100. In the drawing, there is shown only the left-hand piston, with the space 101 defined therebetween constituting a variable hydraulic chamber for actuating said left and righthand pistons 14. The cylinder wall part constituting said hydraulic chamber 101 is formed with a communication opening 103 which is kept in communication with a conventional hydraulic master cylinder, not shown, for the supply and discharge of pressure oil to and from said chamber, as will be more fully described hereinafter, by means of a flexible tube, although not shown. The hydraulic chamber is formed further with a vent opening adapted for discharging air from the chamber when hydraulic pressure is applied to the assembly 12. In addition, a coil spring 102 is positioned between the hydraulic pistons 14 and is kept in its compressed state for keeping the pistons separated from each other and transmitting motion from one to the other of said pistons. Each of the pistons 14 is fitted at its inside or hydraulic pressure-receiving end with a piston cup 104 which is made of an elastic substance such as rubber for assuring an effective seal against loss of the oil from the hydraulic chamber 101.

A dust-proof cover 15, made of an elastic substance such as plastic or rubber, is bridged flexibly between the hydraulic cylinder 13 and each of said pistons 14, as shown.

A pair of brake shoes 18a and 18b is provided and are formed into arcuate rigid arms as shown. Frictional liner elements 19a and 19b are fixedly attached on the outer arcuate surfaces of said shoes, respectively, by means of glue or the like. The upper and inner most extremities 18a' and 18b' of the shoes are kept in pressure engagement with channel-shaped parts of the hydraulic pistons 14, so as to provide tongue-and-groove joints between both of the operating parts, although these channels are not clearly shown in FIG. 1.

In this respect, however, reference may be had to the remaining several embodiments of the invention to be described. The lower and inner-most extremities 18a'' and 18b'' of the shoes are rounded and kept in pressure engagement with channel-shaped recesses 20a and 20b, respectively, formed at the both extremities of a stationary anchor 20, the latter being fixedly mounted on the backing plate 11 by means of set screws 21a and 21b. Thus, the shoe ends 18a'' and 18b'' are slidable to a certain extent up or down in FIG. 1, as well as pivotable in the plane of the paper. For insuring the aforementioned pressure engagement of the shoes with the respective hydraulic pistons, on the one hand, and with the stationary anchor, on the other hand, there are provided two tension springs 22a and 22b which are bridged between the shoes as shown. For this purpose, anchoring recesses 23 – 26 are formed in the outer peripheral surfaces of said shoes for receiving the inwardly turned ends of said tension springs 22a and 22b.

U-shaped springs 28 and 29 are mounted on the backing plate. Headed shoe-holding pins 30 and 31 extend from the backing plate through loose openings 105 and 106 formed through respective shoes 18a and 18b and finally projecting through slots 28a and 29a, respectively, said pins having hook ends which are kept in pressure engagement in the mode of bayonet joints with the outer surfaces of said U-shaped springs for keeping the shoes in pressure contact with the backing plate. Reference should be had also to FIG. 5 for a detailed illustration of this construction.

Figure 2:
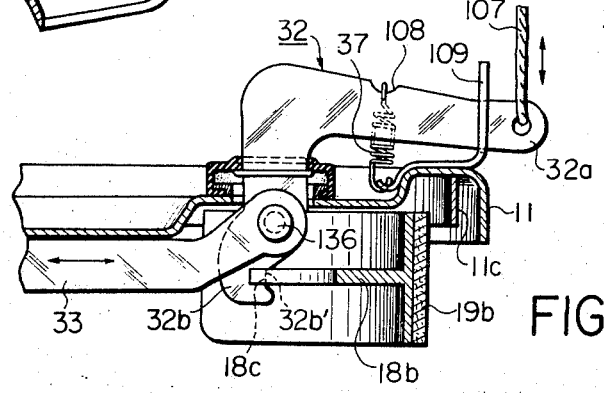
FIG. 2 is a sectional view taken along the section line II—II' shown in FIG. 1.

As most clearly seen from FIG. 2, a lever 32 is formed substantially into an L and one end 32a is connected by a cable 107 to a conventional "parking" or mechanical brake lever or plunger, not shown, while the opposite end 32b of the lever 32 is formed with a recess 32b' which is kept in pressure engagement with a notch 18c formed on the shoe 18b, thereby allowing the engaging point between 32b' and 18c to act as an occasional pivot for the lever 32. To assure the pressure engagement for establishing the occasional pivot, a tension spring 37 is bridged under tension between a recess 108 formed on the lever 32 and a stationary and forked lever guide 109 secured to the backing plate 11 by welding, riveting or the like, although not shown. The configuration of the forked lever guide is most clearly seen from FIG. 4.

A second angle lever 34 is pivotably attached at 38 to the left-hand shoe 18a and one arm 34a of said lever 34 is connected with the left-hand end of a first connecting link 33, the right-hand end of the latter being connected at 136 with the arm 32b of the first angle lever 32.

The second arm 34b of second angle lever 34 is linked at 39 with one end of second connecting link 35, the upper or opposite end of the latter being connected at 41 with a triangle-lever 36 which is pivotably mounted at 40 on the upper and inward end 18a' of shoe 18.

The automatic clearance adjuster assembly, generally shown at 44, comprises a main body 110 which is formed with a longitudinal blind bore 110a receiving rotatably as well as slidably a pin 111, a ratchet wheel 16 being fixedly attached to said pin at its intermediate part. The remaining half of the pin 111 is male threaded at 111a and is engaged with corresponding female threads formed in a longitudinal blind bore 112a at one end of pusher rod 112. The opposite or outer end 112b of this rod 112 is formed into a fork and kept in pivotal connection with a recess 18d formed on the inside periphery of shoe 18b.

Figure 3:
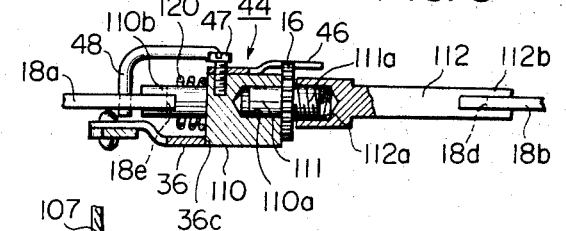
FIG. 3 is a sectional view taken along the section line III—III' shown again in FIG. 1.

Actuating lever 46 made of a leaf spring is pivotably mounted with its base end 47 on the main body 110 and with its free end kept in engagement with the ratchet wheel 16. As seen from FIG. 1, the actuating lever 46 is formed in its plan view into substantially a triangular shape, and one of its apices is pivoted at 47 as referred to above and a second apex is connected through a link member 48, shaped preferably into a U-piece as shown in FIG. 3, to the first shoe 18a. An axial extension 110b of reduced diameter is formed integrally at the outer end of the main body 110, the outer end of said extension being shaped into a fork which is kept in pivotal connection with a recess 18e formed on the upper and inside periphery of the shoe 18a, as seen from FIG. 1. A compression spring 120 is provided around said extension 110b between the related shoe 18a and the main body of adjuster assembly 44 under compression. One of the apices of triangle-lever 36 is kept in constant contact with the outer end of said main body 110. This arrangement is most clearly seen from FIG. 3.

Although the description has been directed to a brake mechanism for one of the rear vehicle wheels, it should be naturally understood that a similar mechanism is also fitted to the remaining rear wheel. Naturally, similar brake mechanisms may be fitted to respective front vehicle wheels, if desired.

The operation of the brake mechanism so far shown and described is as follows. It should be however understood that the following description on the operation will be exclusively directed to a single brake mechanism for one vehicle wheel only, for the purpose of simplicity of the description.

When the driver of the vehicle desires to brake the running vehicle by use of the conventional hydraulic or combined hydro-pneumatic service brake system, he depresses a conventional vehicle brake pedal, not shown. The oil pressure is conveyed from the master cylinder, not shown, through a flexible tube and the passage opening 103 into the working chamber 101 of double piston-cylinder assembly 12, acting as a conventional wheel brake cylinder. Since the cylinder 13 is fixedly mounted, pistons 14 are urged to move outwards in opposite directions from each other, depending upon the oil pressure conveyed to the working chamber. The brake shoes 18a and 18b are expanded forcibly around their slidably anchored points 18a'' and 18b'', respectively, so as to bring the frictional elements 19a and 19b into sliding pressure contact with the inside wall surfaces of brake drum 10 rotating in a counter clockwise direction as shown by an arrow "X," upon filling up the regular brake gap "g" in FIG. 1 which amounts to about 1.5 – 2.0 mm. Thus, the brake mechanism shown in FIG. 1 will perform its braking function in the manner of a "leading-trailing type brake" commonly known per se. Rotation of brake drum 10 in the direction of the arrow "X" corresponds to the forward rotation of the vehicle wheel.

Alternatively, when the driver desires to actuate the parking brake system, he manually pulls the plunger, not shown, towards him. Therefore, motion is transmitted through transmission cable 107 so as to rotate the first angle lever 32 the counter clockwise direction in FIG. 2 around its provisional pivoting point 136, thereby causing the second shoe 18b to be expanded around the piston-shoe contacting point, so as to move its rounded lower end 18b'' from contact with the shoe-anchoring member 20. When the frictional element 19b is brought into pressure contact with the inside wall surface of the rotating brake drum, then the pivoting point of angle lever 32 transfers from 136 to 32b' and the first link member 33 will be pushed in the left-hand direction in FIG. 2 with further counter clockwise rotation of angle lever 32. In this way, second angle lever 34 is rotated in a counter clockwise direction in FIG. 1 about its pivot 38 and second link 35 is pulled downwards. Thus, the triangle-lever 36 is also rotated in the counter clockwise direction in FIG. 1 about its pivot 40.

Simultaneously with the counter clockwise rotation of second angle lever 34, the first brake shoe 18a is expanded outwards about the piston-shoe contacting point, under the influence of the transmitted force through said link 33 and second angle lever 34. Thus, the lower and inner end 18a'' is disengaged from the receiving recess on the stationary anchor 20.

Since the lever 36 is kept in contact with the outer extremity of main body 110, motion is transmitted from the lever through the clearance adjusting assembly 44 to the second shoe 18b about 18c in the expanding direction of the related shoe, until the latter is brought by its frictional element 19b into sliding and pressure contact with the rotating brake drum 10. The reaction force thus produced will be transmitted from the clearance adjusting assembly to the triangle lever 36 which then performs a counter clockwise rotation about its contacting point 36c as seen in FIG. 3. Thus the first shoe 18a is caused to expand about 38 as its rotational center. Under these conditions, the adjusting assembly 44 and the first link member 33 will act as respective floating anchors for the shoes 18a and 18b. With the rotation of the brake drum 10 in the counter clockwise direction "X" in FIG. 1 and with the shoes thus applied, the brake mechanism will act in the parking brake working mode, as a kind of duoservo-brake system which provides a considerably larger braking force with a comparatively small manual braking effort. In the case of backward running of the vehicle, the brake drum 10 rotates in the clockwise direction in FIG. 1, and similar braking effects will be realized.

When the parking brake is applied while the service brake is being used, for the parking purpose, or in an emergency, as occasion may desire, the results will be the addition of the both braking effects.

It should be mentioned, however, that when the parking brake effect is predominant to the service brake effect, the shoes will be expanded with their lower ends 18a'' and 18b'' kept in separation from the anchor member 20, thus the whole brake mechanism acts as the duoservo-brake type, where the overall braking effort is most efficient with a certain amount of the overall brake input. This working mode is therefore most effective to urgently stop the running vehicle, for instance, on a steeply inclined road surface. The braked conditions will remain effective even upon the stoppage of the vehicle.

On the contrary, when the service brake effect is predominant to the parking brake one, the whole brake mechanism will act as the leading-trailing type. In this case, the addingly effective braking action will be convenient for stopping the vehicle rather urgently, especially on the inclined road surface.

When the vehicle has been brought to dead stop under actuation of said both kinds of brakes, the driver may release the service brake only. In this case, the toggle effect only remains effective for keeping the shoes in their expanded state. In this case, it should be noted that the lower shoe ends $18a''$ and $18b''$ will be kept separated from pressure contact with the anchor member, or they will become newly separated. Thus, the whole braking operation will become that of a duoservo-brake.

In a comparative conventional brake assembly comprising the service brake section and the parking brake section in combination with each other, yet with no provision of the mechanical linkage mechanism consisting of several members as at 35, 36 and 44, it will be observed that when both brake sections have been actuated and the service brake effect is predominant to the parking brake effect, the whole brake mechanism will become unintentionally non-effective, should the service brake be released.

In the foregoing embodiment, if the brake gap "$g$" should increase beyond a certain predetermined value on account of excessive wear of the respective frictional elements $19a$ and $19b$, the results will be as follows.

When the service brake is applied under these conditions, the upper shoe ends $18a'$ and $18b'$ will be urged to expand as before. The expanded first shoe $18a$ will provide a pull through link 48 to elastic lever 46 so that the latter will be caused to rotate in counter clockwise direction in FIG. 1 about its pivot 47. Thus, the actuator end of the lever will be advanced one tooth pitch with the ratchet wheel 16 kept in position without rotating. When the service brake is released, the shoes retract toward each other under the influence of return spring $22a$ and the actuator lever 46 is urged to rotate in clockwise direction in FIG. 1, thereby rotating ratchet wheel 16 and advancing the pusher rod 112 rightward a certain distance by the threaded engagement at $111a$–$112a$. In this way, the enlarged brake gap is adjusted back to the design value "$g$." Since this gap adjusting operation is carried out during the return or contracting stroke of the shoes, the adjusting rotation of ratchet wheel 16 together with pin 111 is released from the brake load and is smoother and lighter than it would be otherwise.

The above mentioned gap adjusting operation can be brought about in the same way during the return stroke of the parking brake through the mechanical linkage connecting both brakes.

Figure 6:
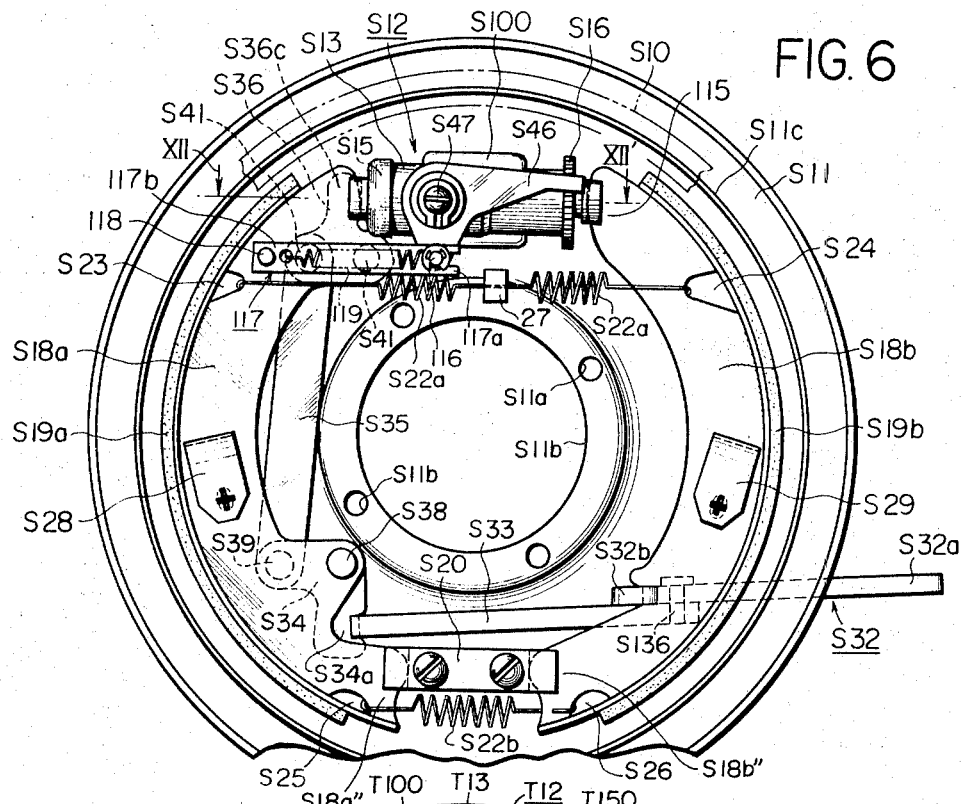
FIG. 6 is a similar view to FIG. 1, showing a second embodiment of the invention.
Figure 12:
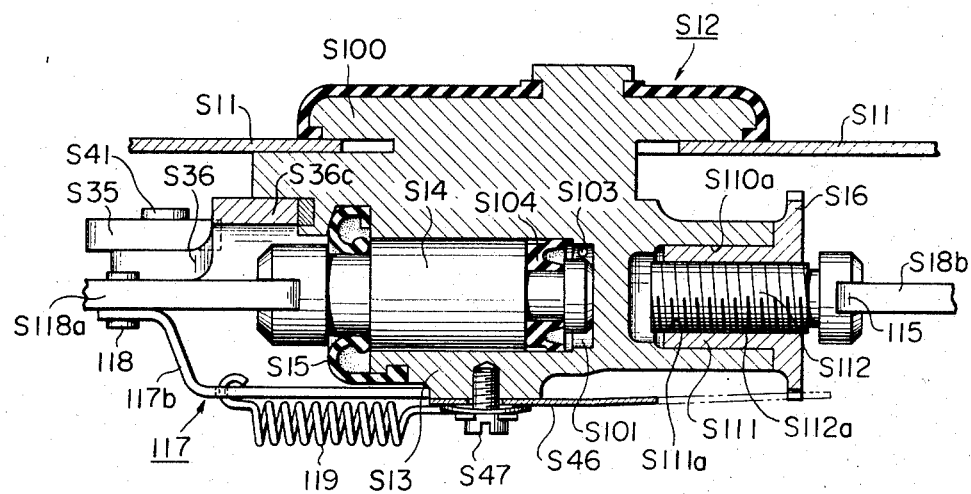
FIG. 12 is a sectional view taken along the section line XII—XII' shown in FIG. 8.

In the second embodiment shown in FIGS. 6 and 12, the main difference thereof from the foregoing embodiment resides in the combination of the automatic clearance adjuster with the hydraulic brake cylinder unit acting as the service brake. A further difference resides in the movable arrangement of the hydraulic cylinder relative to the backing plate. A still further difference resides in that the hydraulic brake cylinder is provided with only one piston, instead of two.

It should be noted that same or similar constituents of the brake mechanism according to this second embodiment to those employed in the foregoing first embodiment are denoted with same reference symbols as before, yet attached with a common character "S" placed in the heading of each of the symbols. For instance, the brake drum in the present embodiment is denoted with "S10" in place of "10" in the foregoing embodiment.

In the present embodiment, the wheel cylinder assembly S12 is mounted slidably in the axial direction thereof on the backing plate S11, as most clearly seen from FIG. 12. The actuator S46 is pivotably mounted at S47 on the hydraulic cylinder block S13 in place of the gap adjuster assembly 44. A blind bore S110a adapted for rotatably and slidably receiving the stem S111 if is formed in the cylinder block S13 in place of adjuster body 110. The stem and ratchet wheel assembly S16, S111 is formed with a female threaded axial bore S111a engagingly receiving a male threaded pusher S112 which is mechanically connected with the right-hand brake shoe S18b through a tongue-and-groove connection at 115. Single piston S14 and piston cup S104 are assembled together and slidably mounted in the cylinder S13, the working chamber S101 being formed with a communication opening S103 for the supply and exhaust of pressure oil. The head of the hydraulic piston S14 is connected mechanically with the left-hand brake shoe S118a through the intermediary of a tongue-and-groove connection as before.

Actuator lever S46 is provided with a pin 116 which is kept in pressure engagement with a fork end 117a of a connecting link 117, the opposite end 117b of the latter being linked at 118 with the left-hand shoe S18a. For assuring the pressure contact of said pin 116 with the forked link end 117a, there is provided a tension spring 119. A stationary anchor member 27 is fixedly mounted on the backing plate S11, said anchor holding a central part of upper shoe-returning spring S22a.

Lower shoe-returning spring S22b is provided between the lowermost ends of both braking shoes for attaining a more convenient and compact arrangement of the spring which corresponds to that shown at 22b in FIG. 1.

Other constituents are substantially similar to those of the foregoing first embodiment, thus their relative arrangement and functions will be obvious from the foregoing description.

When the service or hydraulic brake is actuated, pressure oil is supplied through communication opening S103 into the cylinder chamber S101 so that the piston S14 is urged to slide in the left-hand direction in FIGS. 6 and 12. Thus, the first brake shoe S18a is expanded as before. In this embodiment, however, cylinder block S13 is moved equally, in the opposite or right-hand direction by virtue of its slidable arrangement, as well as the hydraulic reaction implied thereto. Thus, the second brake shoe will be expanded, and therefore the brake mechanism will act in the form of the leading/trailing type as before.

When the emergency or mechanical brake is actuated so as to raise the right-hand end S32a of first angle lever S32, motion is transmitted in a substantially similar manner as before. Thus, the shoes S18a and S18b will be expanded in the form of a duoservo type brake, because the emergency brake and the mechanical linkage connecting the latter with the service brake are substantially similar to those of the first embodiment as shown in FIG. 6 by comparing the several corresponding members such as S18a, S18b, S20, S22a, S22b, S32 and S36.

It will be well understood that a simultaneous or successive application of both brakes in this second embodiment has the same effect as that described in the foregoing first embodiment in the similar operating mode.

In the following list, a table of practical tests of the second embodiment brake is given. In this table, the numerals 1 – 6 in the first column show test item numbers in succession. The figures listed in the second column represent several different hydraulic pressures fed to the wheel brake cylinder supplied through communication opening S103. Several figures listed in the third column represent several different mechanical efforts supplied to the parking brake as its input. In this table, "S" is an abbreviation of service brake, and "P" is that of "parking brake."

TABLE

| Test number | Hyd. cyl. pressure, kg./sq. cm. | Parking brake force, kgs. | (1) S | Braking torque, kg.-mm. | | | (5) S | (3)−(1) or (3)+(5) | (2) or (4), kg.-m. |
| --- | --- | --- | --- | --- | --- | --- | --- | --- | --- |
| | | | | (2) P | (3) S+P | (4) P | | | |
| 1 | 25 | 5 | | 7.0 | 40.0 | | 35.0 | 5.0 | 7.0 |
| 2 | 10 | 10 | | 35.5 | 36.0 | | 9.0 | 27.0 | 35.0 |
| 3 | 20 | 8 | | 22.0 | 35.0 | | 22.5 | 12.5 | 22.2 |
| 4 | 25 | 5 | 37.5 | | 42.5 | 7.0 | | 5.0 | 7.0 |
| 5 | 10 | 10 | 11.0 | | 27.0 | 25.5 | | 16.0 | 25.5 |
| 6 | 20 | 8 | 27.5 | | 33.0 | 20.0 | | 5.5 | 20.0 |

According to further test results, it was found that a similar operational function can be obtained in the case of the first embodiment.

As may be seen, the automatic brake gap adjustment function is also substantially the same. In this case, the link 117 serves as the foregoing link 48. Main body 110 in the first embodiment has been incorporated into the slidable cylinder block S13 in this case. Adjuster wheel assembly 16 and 111 in the foregoing has been transformed into the assembly S16 and S111, while the pusher bar 112 has been modified into that denoted S112 in this case. Corresponding functions are also similar to the foregoing in their operation.

Next, referring to FIGS. 7 and 13, the third embodiment of the invention will now be described in detail. It should be noted however that the same or similar constituent parts to those used in the foregoing first embodiments have been denoted with corresponding same reference symbols as before, with "T" attached to each heading.

In the present third embodiment, the service brake cylinder is divided into two upper and lower piston-cylinder units T12 and T12' having respective cylinder blocks T13 and T13' which are fixedly mounted on the backing plate T11 through the intermediary of respective mounting plates T100 and T100'. As seen especially from FIG. 13, the hydraulic unit T12 has a single piston T14 which is provided with an elastic piston cup T104 as before and is slidably and rotatably coupled with the upper and inner end extremity of second brake shoe T18b through a tongue-and-groove connection T150 formed on an extension T14a of the hydraulic piston T14. The outer extremity of cylinder block T13 is similarly coupled with the upper and inner extremity of first brake shoe T18a through a tongue-and-groove connection T115 similar to that shown at 115 in FIG. 12.

The lower hydraulic unit T12' is arranged between the lower end of brake shoes T18a and T18b parallel to the upper unit T12, with the piston facing the opposite direction. Corresponding constituents of the lower unit are denoted with same reference symbols used in the upper unit, with each having a single prime attached thereto.

In the present embodiment, the emergency or parking brake comprises an actuating lever T32 and a toggle bar T33 mechanically linked therewith and arranged in a substantially similar manner to those at 32 and 33 in FIGS. 1 and 2. Bar T33 is however connected directly at 151 with the lower end of the first brake shoe T18a in place of second angle lever. The mechanical linkage connecting the emergency brake and the service brake is operatively connected with second brake shoe T18b rather than the first brake shoe T18a and comprises second lever T34, connecting link T35 and third lever T36, these members being arranged in a substantially similar manner to those denoted as 34, 35 and 36 in the foregoing embodiments. In the present embodiment, lever T34 is connected at T34a with the actuating lever T32 in place of the first connecting link 33 in the foregoing embodiments. This link mechanism and its arrangement and function may be easily understood from the foregoing description by reference to several reference symbols T34 – T36 and T38 – T40 which are similar to 34 – 36 and 38 – 40 in the foregoing embodiments.

Figure 13:
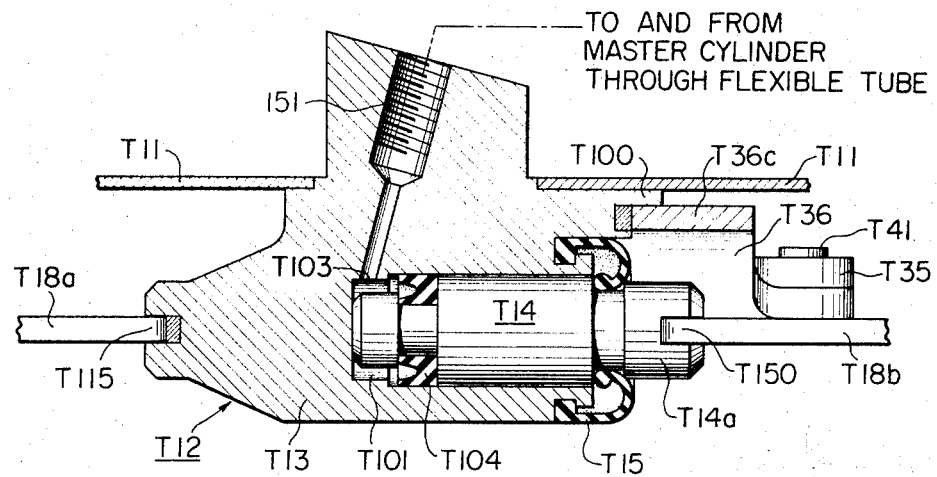
FIG. 13 is a sectional view taken along the section line XIII—XIII' shown in FIG. 9.

When the service brake is actuated, pressure oil is conveyed from a hydraulic master cylinder, as before, through a flexible tube, not shown, inlet passages as at 151 and inlet openings as at T103 in FIG. 13 into hydraulic chambers such as T101 of the hydraulic cylinders T13 and T13', so as to expand the lower end T18a" of first sole T18a and the upper end T18b' of second shoe T18b, respectively, through the working pistons T14 simultaneously. In this case, the left-hand end T13a of upper cylinder T13 and the right-hand end T13a' of lower-cylinder T13' act as respective anchors. Thus, the hydraulic brake acts as a kind of trailing type brake.

On the contrary, when the emergency brake is actuated as before so as to raise the outer end T32a of actuating lever T32, both brake shoes T18a and T18b are expanded at their respective lower ends T18a'' and T18b'', as in the foregoing embodiments.

Figure 7:
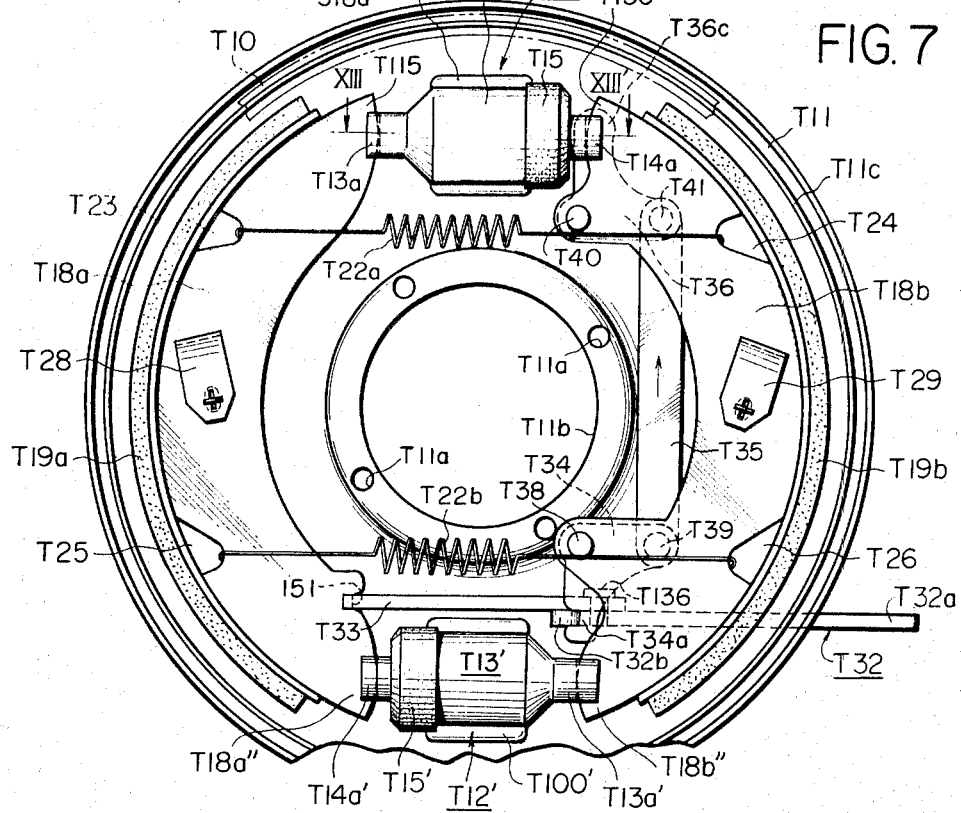
FIG. 7 is a similar view to FIG. 1, showing a third embodiment of the invention.

Second lever T34 is rotated in a counter clockwise direction in FIG. 7 and connecting link T35 is urged to move upwards in the same figure, so as to rotate third lever T36 in counter clockwise direction about its pivot pin T40 until the upper end T36c of the lever is brought into pressure contact with the outer extremity of the upper cylinder block T13. Reaction thus generated is transmitted through lever T36 to the second shoe T18b at its upper end T18b', so as to expand the shoe. Therefore, the emergency brake acts as a kind of leading-trailing type brake.

As will be seen from the foregoing description, a simultaneous or successive actuation of both said brakes results in substantially an adding effect as before.

In this embodiment, the automatic gap adjuster may be fitted as in the first or second embodiment as occasion may desire, although it is not shown and described.

In the fourth embodiment shown in FIG. 8, the same or similar constituents to those employed in the first embodiment are denoted with respective the same reference symbols, except for attaching each with "U" in the heading for easy comparison.

The main difference between the present embodiment and the foregoing third embodiment resides substantially in the additional provision of an auxiliary mechanical linkage comprising fourth lever U34', third link member U35' and fifth lever U36'. The mutual link connection with each other and with the first shoe U18a may be well understood from the foregoing when compared with corresponding reference symbols: U36', U38' – U40'. As seen, toggle bar U33 is connected at its right-hand end with fourth lever U34' substantially in the same way as the second embodiment.

The provision of the auxiliary link mechanism serves for changing the former two-leading brake type into the leading-training type when the emergency brake is applied in the course of forward running of the vehicle which corresponds to the counter clockwise rotation of brake drum U10. Other operating modes of the present embodiment are the same as in the foregoing embodiment shown in FIGS. 7 and 13. In this case, the automatic gap adjuster may be fitted as in the foregoing several embodiments.

In the fifth embodiment shown in FIG. 9, the same respective reference numerals are attached with a "V" in each heading thereof and are used for the same or similar constituents as in the first embodiment. In practice, this fifth embodiment is a modification from the foregoing third or fourth one, and therefore, only the main differences therefrom will be described in the following description.

The hydraulic piston-cylinder unit V12, of the single piston type, is slidably mounted on the backing plate V11 in the same way as shown in FIG. 12, for use as the service brake unit as in the embodiment. The left-hand end V13a of the cylinder block V13 is linked with a fifth lever V36' at its upper end V36c' through a tongue-and-groove connection as shown, the lever being pivotably mounted at V40' on the backing plate V11 and connected at V41' with the upper end of third connecting link V35'. The lower end of this link is pivotably connected at V39' to a fourth lever V34' which is in turn linked at V38' with first shoe V18a at its lower end V18a''. The lower ends V18a'' and V18b'' of brake shoes V18a and V18b are normally kept in constant contact with a stationary anchor V20, in the same way as the corresponding arrangement shown in FIG. 1 or 6. The members V34', V35' and V36' constitute a second or auxiliary linkage connecting the emergency or parking brake with the service brake as in the foregoing embodiment shown in FIG. 8.

Tension spring 149 is bridged between lever V36' at 148 and a stationary stop 147 on the backing plate V11 for urging the lever to turn in a clockwise direction in FIG. 9. An additional tension spring 152 is bridged between a further stationary stop 146 on the backing plate V11 and the recess V24 formed on second brake shoe V18b, for urging the upper end of the latter to move in the shoe-contracting direction. In the present embodiment, the upper end V18a' of first brake shoe V18a is pivotably mounted at 145 on the backing plate V11 as shown.

The operation of the fifth embodiment is as follows:

When the service brake is applied, oil pressure is conveyed to the working chamber, not shown, in cylinder block V13, thereby causing piston V14 to be urged hydraulically to move rightwards in FIG. 9 so as to rotate the second brake shoe V18b in a clockwise direction about its lower end V18b'' which is kept in pressure contact with stationary anchor V20, until the friction member V19b is brought into sliding contact with the rotating brake drum V10. Reaction is then transmitted from the leftward sliding cylinder block V13 to fifth lever V36' so that the latter is rotated in the counterclockwise direction in FIG. 9 and third link V35' is moved downwards. In this way, fourth lever V34' is turned in a counter clockwise direction about its pivot V38' and thus, first shoe V18a is rotated in its expanding direction around its pivot 145. It will be easily seen that when the drum rotates in the clockwise direction, the service brake acts as a two-leading type brake.

When the emergency brake is actuated, second shoe V19b is applied first as before, and then, the reaction thus produced is transmitted through toggle bar V33 to third lever V34' which is then rotated in the counter clockwise direction about its lower and inner end kept in pressure contact with anchor V20, thus causing the first shoe V18a to be rotated about its pivot 145 in the shoe-expanding direction. At the same time, second lever V34 is rotated in the clockwise direction, so as to raise the link bar V35 upwards and thus rotate third lever U36 in the counter clockwise direction about its pivot V40. Thus, the brake cylinder unit V12 is urged to slide leftwards. Motion is therefore transmitted from the cylinder unit through lever V36' and link V35' to lever V34' which is caused to turn. The counter clockwise rotation of third lever V36 will cause the upper end V18b' to move outwards. At the same time, the lower shoe end V18b'' is also urged to move outwards by the actuating force transmitted thereto through pivot pin V38. Therefore, the mechanical brake acts as a kind of leading-trailing brake.

The above analysis is applied to the forward running vehicle wherein the brake drum V10 rotates in a counter clockwise direction in FIG. 9. In the case of rearward running, the service brake acts as a two-leading brake. This will apply to the emergency brake.

Also, the present embodiment may be fitted with an automatic brake gap adjuster in the manner already described with reference to FIG. 1 or 6. This may be applied to the remaining two embodiments to be described in connection with FIGS. 10 and 11.

Figure 10:
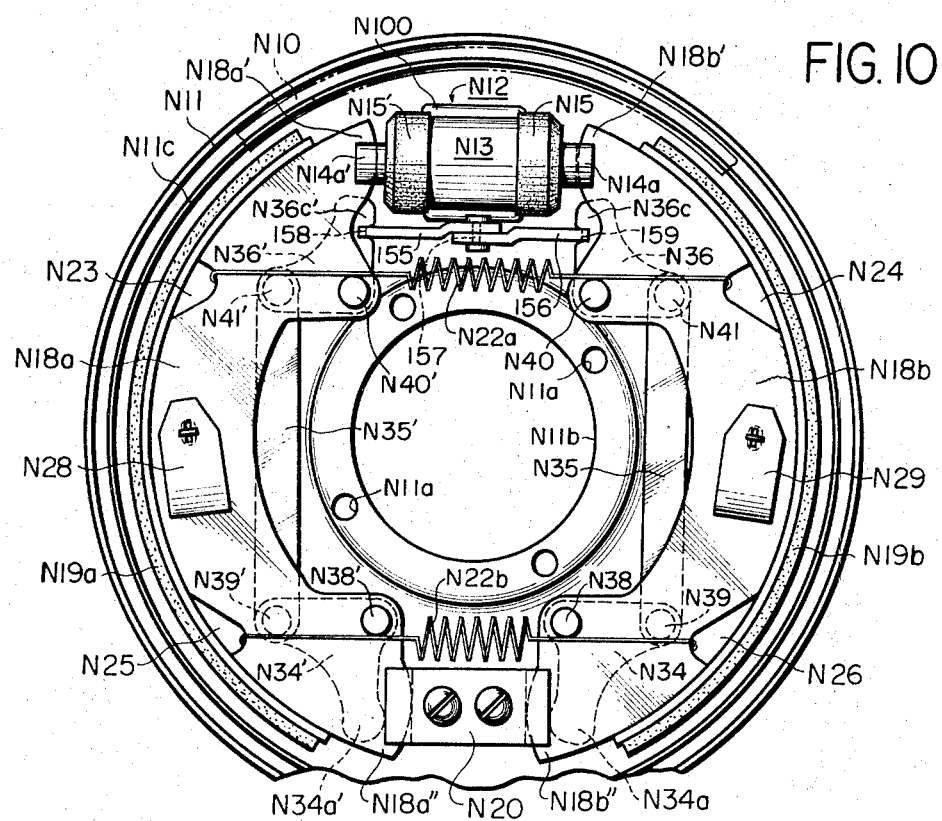

In the sixth embodiment of the invention, shown in FIG. 10, which is a modification from the fifth embodiment shown in FIG. 9, the same reference numerals are attached with "N" in each heading and are employed for same or similar constituents as those employed in the first embodiment for easy comparison and for avoiding a repeated description.

In the following, the only main differences of the present embodiment from the fifth embodiment are explained. In the present case, the cylinder block N13 of the hydraulic assembly N12 is fixedly mounted on backing plate N11 in the similar same manner shown in FIG. 13. The cylinder block N13 has a pair of working pistons as can be seen from the existence of the respective piston extensions N14a and N14a' which are kept in pressure engagement with the respective upper ends N18a' and N18b' of shoes N18a and N18b, respectively, each through a tongue-and-groove connection as before. The lower ends N18a'' and N18b'' of these shoes are normally kept in detachable, slidable and pivotable abutment with both ends of a stationary anchor member N20 as in the foregoing fifth embodiment shown in FIG. 9.

Lever N34 is pivotably mounted at N38 on the lower end of second shoe N18b and is linked at N29 with the lower end of a link member N35 which is connected at its upper end with lever N36 at N41. This lever N36 is connected at N40 to the upper end N18b' of second shoe N18b.

Lever N34', link member N35' and lever N36' are arranged in a symmetrical manner similar to members N34, N35 and N36 relative to first shoe N18a as shown. Pivots N38', N39', N40' and N41' are arranged similarly with those denoted with respectively corresponding reference symbols without the attached prime symbol.

The respective lower ends N34a and N34a' of lever N34 and N34' are arranged to be brought into contact with the respective ends of anchor N20, when the emergency brake is actuated. Levers 155 and 156 are connected at 157 so as to establish an angle when seen from above or below FIG. 10, although not shown. Opposite ends 158 and 159 of these levers 155 and 156 remote from the pivoted connection at 157 are linkedly connected with the first and second brake shoes as shown. The provision of mutually linked levers 155, 156 may be so modified that they are arranged to cooperate with the lower lever pair N34, N34', in place of the upper lever pair N36, N36'.

The operation of the present embodiment is as follows:

When the service brake is actuated, pressure oil is conveyed as usual to the working chamber, not shown, of the cylinder block N13, so as to urge the pistons with their extensions N14a and N14a' outwardly for expanding both shoes N18a and N18b with their upper ends N18a' and N18b', respectively, about their respective lower ends N18a'' and N18b'' which are kept in pressure contact with stationary anchor N20.

It will be seen from the foregoing that the service brake acts as a leading-trailing type brake when the brake drum rotates in a counter clockwise direction in FIG. 10. With the drum rotating in the opposite or clockwise direction, the service brake will also act in the similar manner of a leading-trailing type brake.

Although not shown, emergency brake actuating means is connected with the hinge at 157 in such a way that when the brake is actuated the interconnected levers 155, 156 are toggled for expanding the upper ends of the shoes.

With the emergency or mechanical brake is actuated, motion is therefore transmitted from lever 156 to lever N36 which is thus rotated in a clockwise direction about its pivot N40, thereby causing the link N35 to be lowered. In this way, lever N34 is also rotated in a clockwise direction about its pivot N38 until the lower end N34a is brought into contact with stationary anchor N20. Reaction is then transmitted reversely through the mechanical linkage to the upper end N18b' of second shoe N18b which is thus expanded around its lower end N18b''.

Motion is transmitted through left-hand lever 155 to the related rotatable lever N36' which is thus rotated in a counter clockwise direction in FIG. 10. In this way, first shoe N18a is also expanded around its lower end N18a''. Therefore, the emergency brake will act as a kind of two-leading type brake, regardless of the rotational direction of drum N11.

Figure 11:
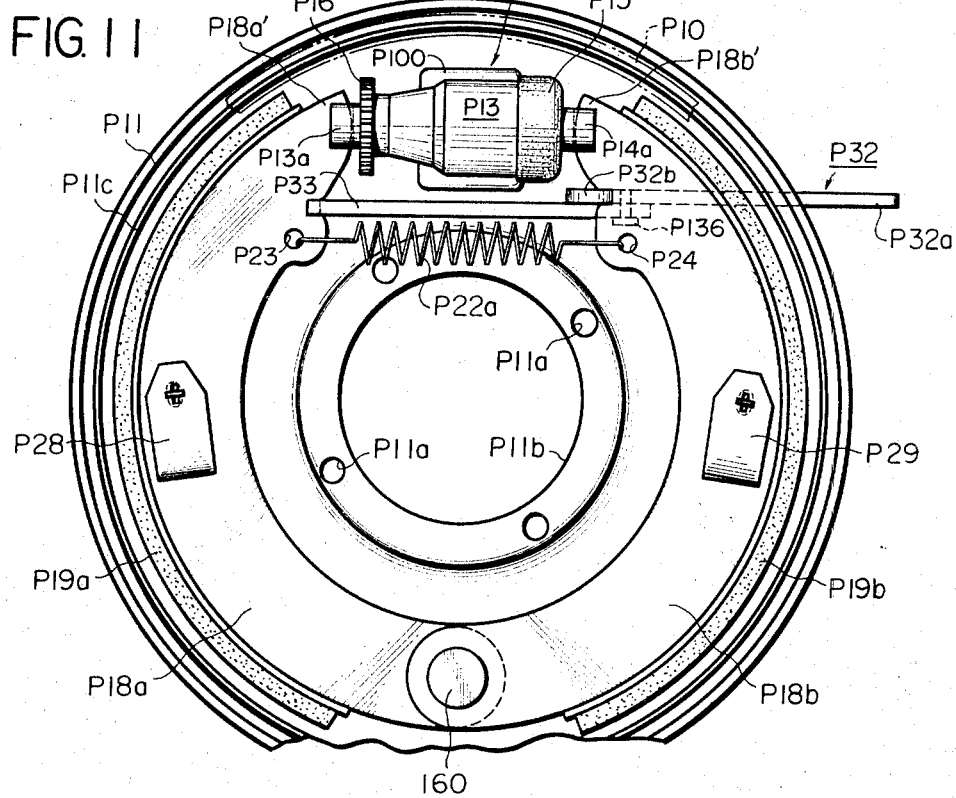

In the seventh or last embodiment shown in FIG. 11, the same reference symbols with a "P" attached are employed for the same or similar constituents as those employed in the first embodiment shown in FIGS. 1–5.

In this case, hydraulic cylinder unit P12 is fixedly mounted on the backing plate P11 and has only one working piston as seen at P14a which shows an extension of the piston. Cylinder block P13 is provided with an extension P13a which is provided in turn with a brake gap adjusting sprocket wheel P16 as in the case of the foregoing embodiment shown in FIG. 6. The cylinder extension P13a is pivotably connected with the upper end P18a' of first brake shoe P18a through a tongue-and-groove connection. In a similar way, the piston extension P14a is pivotably connected with the upper end P18b' through a tongue-and-groove connection as before.

The lower ends of both shoes P18a and P18b are hinged with each other at 160.

Emergency brake actuating means is connected mechanically with the right-hand end P32a of angle lever P32 by a cable, not shown, but may be similarly constructed at 107 in FIG. 2. The left-hand end of the angle lever P32 at P32b is pivotably connected with the upper end P18b' of second shoe P18b through a tongue-and-groove connection as shown. Toggle bar P33 is hinged at P136 with the right-hand end of the angle lever P32, while the left-hand end of the toggle bar is connected with the upper end P18a' of first brake shoe P18a through a tongue-and-groove connection as shown. The remaining construction of the present embodiment can easily be understood by reference to other reference symbols together with the foregoing description.

The operation of the present embodiment is as follows.

When the service brake is actuated, the right-hand working piston of the hydraulic unit P12 is actuated so as to expand the second brake shoe with its upper end and about its lower hinged end at 160. At the same time, thrust is transmitted from second shoe P18b through the common hinge to the lower hinged end of first shoe P18a so that the latter is expanded at its lower end and around its upper end P18a' which is pivotably anchored by the cylinder end P13a. Therefore, the service brake acts as a uniservo-brake when the brake drum P10 rotates in counter clockwise direction in FIG. 11. On the contrary, it will be clear, the service brake acts as a duoservo-brake when the drum rotates in the clockwise direction.

When the emergency brake is actuated so as to raise the right-hand end P32a of angle lever P32, the shoe ends P18a' and P18b' are urged to expand outwardly so that a duoservo-brake action is thereby realized despite the rotational direction of the brake drum.

In the following table, the working modes of the foregoing several embodiments are listed for easy comparison.

| Embodiments | Rotation of Drum | TABLE Kind of Brake service | emergency |
|---|---|---|---|
| | | Type of Brake | |
| 1 | I | LT | DS |
| | II | LT | DS |
| 2 | I | LT | DS |
| | II | LT | DS |
| 3 | I | 2T | LT |
| | II | 2L | 2L |
| 4 | I | 2T | 2L |
| | II | 2L | 2L |
| 5 | I | 2T | LT |
| | II | 2L | 2L |
| 6 | I | LT | 2L |
| | II | LT | 2L |
| 7 | I | TDS | DS |
| | II | DS | DS |

In the above table, "I" means "counter clockwise rotation of brake drum", while "II" means "clockwise rotation thereof." "LT" means "leading-trailing" and "DS" means "duoservo." "2T" means "two trailing" and "2L" means "two leading." "TDS" means "trailing duoservo."

Without further detailed description, the foregoing will fully reveal the essence of the present invention so that those skilled in the art can by applying current knowledge readily adapt it for various applications without omitting features that, from the standpoint of prior art, constitute essential characteristics of the generic or specific aspects of this invention, and therefore, such adaptations should be intended to be included within the range of equivalence of the following claims.

We claim:

1. An automotive wheel brake assembly comprising, a stationary backing plate fixedly attached to an axle support means, a first and a second curved brake shoe movably mounted on said backing plate opposite one another, a rotatable brake drum positioned around said brake shoes for frictional engagement therewith, a hydraulic service brake actuator assembly slidably mounted on said backing plate between a first pair of adjacent ends of said first and second brake shoes, said hydraulic actuator assembly including a housing slidably attached to said backing plate and having a bore therein slidably containing a piston, said piston being operatively connected with the first end of said first brake shoe, the first end of said second brake shoe being pivotally attached to said backing plate, a stationary anchor secured to said backing plate between the second pair of adjacent ends of said first and second brake shoes and in abutting relationship therewith, and a mechanical brake shoe expanding means operatively connected with said shoes, said mechanical shoe expanding means comprising a first link means having one end thereof operatively connected with a parking brake applying means, an intermediate portion of said first link means being operatively connected with the second end of said first brake shoe, and the remaining end of said first link means being operatively connected with the second end of said second brake shoe, a second motion transmitting link means having one end thereof operatively connected with the first end of said first brake shoe and the piston of said hydraulic brake actuator assembly and the other end operatively connected with the second end of said first brake shoe and the intermediate portion of said first motion transmitting link means, and a third motion transmitting link means having one end thereof pivotally attached to said backing plate and in operative engagement with said housing of said hydraulic brake actuator assembly, the other end of said third link means being operatively connected with the second end of said second brake shoe, the end of said first motion transmitting means and in operative engagement with said stationary anchor.

2. An automotive wheel brake assembly comprising, a stationary backing plate, a pair of curved brake shoes movably mounted on said backing plate opposite one another, a hydraulic service brake actuating means disposed on said backing plate between one pair of adjacent ends of said brake shoes and operatively connected therewith for expanding said brake shoes, a stationary anchor secured to said backing plate between the remaining pair of adjacent ends of said brake shoes in abutting relationship therewith, a brake drum rotatably positioned around said brake shoes for frictional engagement therewith, and a mechanical brake shoe expanding means operatively connected with said brake shoes, and comprising a mechanical parking brake applying means, a first, a second and a third motion transmitting link means, one end of said mechanical parking brake applying means being operatively connected with one end of one of said brake shoes, one end of said first link means being operatively connected with an intermediate point of said mechanical parking brake applying means, the other end of said first link means being operatively connected with one end of said third link means, one end of said second link means being operatively connected with the other end of said third link means, and the other end of said second link means being operatively connected with the other end of said one of said brake shoes, a first and second lever means pivotably mounted on both ends of the other of said brake shoes and pivotably connected with both ends of said third link means, whereby, in case of simultaneous application of the hydraulic service brake and the mechanical parking brake both braking efforts will be applied to said brake shoes, wherein upon release of the hydraulic service brake application the joint brake application effect will be substantially reserved.

3. An automotive wheel brake assembly comprising, a stationary backing plate, a pair of curved brake shoes movably mounted on said backing plate opposite one another, a hydraulic service brake actuating means disposed on said backing plate between one pair of adjacent ends of said brake shoes and operatively connected therewith for expanding said brake shoes, a stationary anchor secured to said backing plate between the remaining pair of adjacent ends of said brake shoes in abutting relationship therewith, a brake drum rotatably positioned around said brake shoes for frictional engagement therewith, and a mechanical brake shoe expanding means operatively connected with said brake shoes, said shoe expanding means including a first motion transmitting link means, said first motion transmitting link means having one end thereof operatively connected with an intermediate portion of a mechanical parking brake actuating means, one end thereof operatively connected with the end of one of said brake shoes forming the remaining pair of adjacent ends of said brake shoes, and the other end of said first motion transmitting link means being operatively connected with the end of the other of said pair of brake shoes forming the remaining pair of adjacent ends thereof, a second link means having the ends thereof operatively connected with the ends of said other brake shoe, and a third link means being operatively connected with both of said brake shoes at the ends thereof forming said one pair of adjacent ends, said third link means having an automatic brake clearance adjusting means operatively connected therein for automatically adjusting the length of said third link means, whereby, in case of simultaneous application of the hydraulic service brake and the mechanical parking brake both braking efforts will be applied to said brake shoes, wherein upon release of the hydraulic service brake application of the joint brake application effect will be substantially reserved.

4. A wheel brake assembly as claimed in claim 3, wherein said hydraulic service brake actuator means is slidably mounted on said backing plate, said hydraulic service brake actuator means forming said third motion transmitting link means between one pair of adjacent ends of said brake shoes.

5. An automotive wheel brake assembly comprising, a stationary backing plate attached to an axle support means, a first and second brake shoe movably disposed on said backing plate opposite one another, a first hydraulic service brake actuator assembly disposed on said backing plate between two adjacent first ends of said brake shoes, said actuator assembly including a housing having a bore therein with a piston slidably mounted in said bore, said housing being fixedly secured to said backing plate, said piston being operatively connected with the first end of the first brake shoe and the actuator housing being in abutting relationship with the first end of the second brake shoe to serve as an anchor therefor, a second hydraulic service brake actuator assembly disposed on said backing plate between two adjacent second ends of said brake shoes, said second brake actuator assembly including a housing having a bore therein with a piston being slidably mounted in said bore, said second actuator housing being fixedly mounted on said backing plate and in abutting relationship with the second end of the first brake shoe, said piston of said second actuator assembly being operatively connected with the second end of said second brake shoe, a brake drum rotatably positioned around said brake shoes for frictional engagement therewith, and a mechanical brake shoe actuating means including a first and a second motion transmitting link means, said first link means having one end thereof operatively connected with an intermediate point of a mechanical parking brake applying means, and the remaining end of said first link means being operatively connected with the second end of said second brake shoe, said second link means having one end thereof being operatively connected with the first end of said first brake shoe and with the piston of said first hydraulic actuator assembly, the remaining end of said second link means being operatively connected with the second end of said first brake shoe and with one end of said mechanical parking brake applying means.

6. An automotive wheel brake assembly as claimed in claim 5, wherein said mechanical shoe expanding means further comprises, a third link means having one end thereof operatively connected with the second end of said second brake shoe and the remaining end of said first motion transmitting means, the other end of said third link means being operatively connected with the first end of said second brake shoe and with the stationary housing of said first hydraulic actuator assembly.

* * * * *